US007009961B2

(12) United States Patent
Pietrowicz et al.

(10) Patent No.: US 7,009,961 B2
(45) Date of Patent: Mar. 7, 2006

(54) INTERCONNECTING VOICE-OVER-PACKET AND ANALOG TELEPHONY AT A DESKTOP

(75) Inventors: Stanley Pietrowicz, Freehold, NJ (US); Evan Freed, Summit, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 738 days.

(21) Appl. No.: 09/911,297

(22) Filed: Jul. 23, 2001

(65) Prior Publication Data

US 2003/0026244 A1  Feb. 6, 2003

(51) Int. Cl.
*H04L 12/66* (2006.01)
(52) U.S. Cl. .................... 370/352; 379/88.17; 709/202
(58) Field of Classification Search ........ 370/352–356, 370/401, 400; 379/88.17; 709/201–203
See application file for complete search history.

(56) References Cited

U.S. PATENT DOCUMENTS 6,798,745 B1 * 9/2004 Feinberg .................... 370/235
6,914,897 B1 * 7/2005 Schuster et al. ............ 370/352
2002/0110112 A1 * 8/2002 Tuomi ........................ 370/352
2002/0176404 A1 * 11/2002 Girard ........................ 370/352
2003/0002476 A1 * 1/2003 Chung et al. ............... 370/352

* cited by examiner

Primary Examiner—John Pezzlo
(74) Attorney, Agent, or Firm—Joseph Giordano; James W. Falk

(57) ABSTRACT

PSTN and voice over packet telephony are integrated at a customer premises, thereby reducing the plurality of redundant user I/O devices on the desktop, simplifying management of multiple telephony interfaces, and interconnecting PSTN and VoP calls at the desktop. A desktop appliance interfaces to both the PSTN and a packet network and includes a single set of user I/O and user audio devices, analog telephony functionality, a digital interface, VoP telephony functionality, and a switching and bridging system for interconnecting/bridging the user devices, the PSTN, and the packet network. A desktop PC can also be incorporated with the appliance, the PC providing telephony applications and the appliance providing network connectivity for the PC. Similarly, the PC can provide network connectivity and telephony functionality, with the appliance integrating the PSTN and VoP calls.

13 Claims, 11 Drawing Sheets

INTERCONNECTING VOICE-OVER-PACKET AND ANALOG TELEPHONY AT A DESKTOP

BACKGROUND OF OUR INVENTION

1. Field of the Invention

Our invention relates generally to analog and voice over packet telephony. More particularly, our invention relates to customer premise apparatus for conducting and interconnecting analog and voice over packet telephony calls.

2. Description of the Background

Today's residential and enterprise consumers continue to use the traditional public switched telephone network (PSTN) as the primary way for conducting voice communications. As such, the typical home and enterprise desktops include devices such as analog phones, answering machines, and speakerphones. However, advances in computer technology and the growth of the Internet are making voice communications via packet networks possible (also referred to as voice over packet (VoP)). Under VoP, handsets/headsets/speakerphones along with call control and voice compression technologies are incorporated into the desktop PC to allow consumers to place calls over a packet network, like the Internet. Similarly, emerging service providers are offering commercial-grade voice-over-packet services through the use of dedicated packet-based phones that incorporate network access, call control, and voice compression technologies into a single unit. VoP is becoming increasingly attractive to residential consumers because it provides an inexpensive way to make long-distance calls. Similarly, enterprises, which typically have data networks, are interested in VoP because it provides a way to reduce telecommunication and information technology (IT) costs. However, VoP is far from universal and far from replacing the traditional PSTN. As a result, consumers are faced with a transitional period where both the PSTN and VoP terminate at the desktop. These dual interfaces create several issues, including the need to integrate the PSTN and VoP "worlds" and an increasing amount of equipment on the desktop.

Specifically, today's residential and enterprise consumers typically have multiple PSTN interfaces at the desktop. Because the interfaces are identical technologies, it is well known in the art how to terminate these interfaces in the same device, to manipulate an interface using a single handset, keypad, etc., and to integrate the multiple interfaces to both bridge and transfer calls. However, because VoP and the PSTN are disjoint technologies, they are not easily integrated. Reasons for this difficulty include analog versus digital communications, different methods of call control, differences in delay, noise, and echo sources, and the diversity of interfaces used to access packet networks, including analog access, cable access, LAN access, etc.

Because these technologies are not easily integrated, consumers have an increasing amount of equipment appearing on their desks. This equipment includes the traditional ways of communicating such as analog-based phones/speaker-phones/answering machines, Internet access devices like modems for the PC, and duplicate emerging ways of communicating such as VoP headsets/speakerphones. In addition, consumers have no way to integrate and manipulate the VoP and PSTN interfaces allowing for traditional functionality such as conference calling and the transferring of calls.

SUMMARY OF OUR INVENTION

Accordingly, it is desirable to provide a method and apparatus that integrates traditional analog telephony with VoP telephony at the desktop and reduces the amount of equipment on a consumer's desk, simplifies the management of multiple phones, and allows the analog and packet worlds to be interconnected, thereby overcoming the above and other disadvantages of the prior art. Under our invention, analog and telephony functionalities are integrated into a single desktop appliance, thereby allowing a user to place calls over the PSTN and a packet network. Uniquely, these interactions are made through a single set of user I/O devices (e.g., keypad) and user audio devices (e.g., handset/headset and speakerphone), thereby eliminating duplicate equipment at the desktop, freeing space, and easing the management of multiple interfaces. In addition, the desktop appliance uniquely bridges the PSTN and VoP interfaces, thereby allowing a use to hold, transfer, and conference calls between the PSTN, VoP network, and user audio devices.

In a first embodiment of our invention, the desktop appliance interfaces to both the PSTN and a packet network and as such includes a single set of user I/O and user audio devices, a standard analog interface, analog telephony functionality, a digital interface, and VoP telephony functionality, which includes both VoP call processing and audio compression/decompression. Uniquely, the analog telephony functionality, VoP telephony functionality, and user audio devices are interconnected within the desktop appliance through a digital/analog switching and bridging system. This system, among other features, allows a user to utilize either network interface through the user audio devices, to interconnect the interfaces and audio devices to create various conferencing scenarios, to transfer calls between the two network interfaces, and to bridge the two interfaces, thereby treating the device as a "gateway". Access to the packet network can either be direct (e.g., directly to a LAN), or indirect through the PSTN, a cable provider, etc. In the case of indirect access, the digital interface, as an example, may resemble a standard analog interface with modem functionality.

Because packet networks are able to simultaneously multiplex multiple transactions, the desktop appliance can also support a plurality of VoP calls over the digital interface, in addition to the analog call. Similarly, the appliance can support multiple analog interfaces. Under these two variations of the first embodiment, the switching and bridging system is enhanced to allow interconnectivity among the additional calls.

In a second embodiment of our invention, a desktop PC is integrated with the desktop appliance through a physical connection. This embodiment of the desktop appliance continues to function as the first embodiment with the addition of two enhancements. First, the digital interface within the desktop appliance now provides both the desktop appliance and the desktop PC with access to the packet network, thereby removing the need for a separate PC connection. Second, advanced telephony applications can be provided on the desktop PC to compliment the functionality of the desktop appliance. Specifically, the appliance's analog and VoP telephony functionalities can be controlled and displayed by either the appliance itself or by the desktop PC. In addition, a user audio port on the desktop appliance can be interfaced with the PC to provide enhanced audio functionality.

In a third embodiment of our invention, a desktop PC is again integrated with the desktop appliance, however, the desktop PC now interfaces to the packet network, rather than the desktop appliance, and the appliance uses the PC to gain access to the network. In this embodiment, the VoP voice compression and decompression functionality remains on the appliance; however, the VoP call control is moved to the PC. As such, the desktop appliance continues to handle all speech audio manipulation except for network transmission and reception. The functioning of this embodiment is similar to the first two embodiments, including the continued use of a switching and bridging system to support the interconnectivity of the plurality of interfaces.

DETAILED DESCRIPTION OF OUR INVENTION

Figure 1:
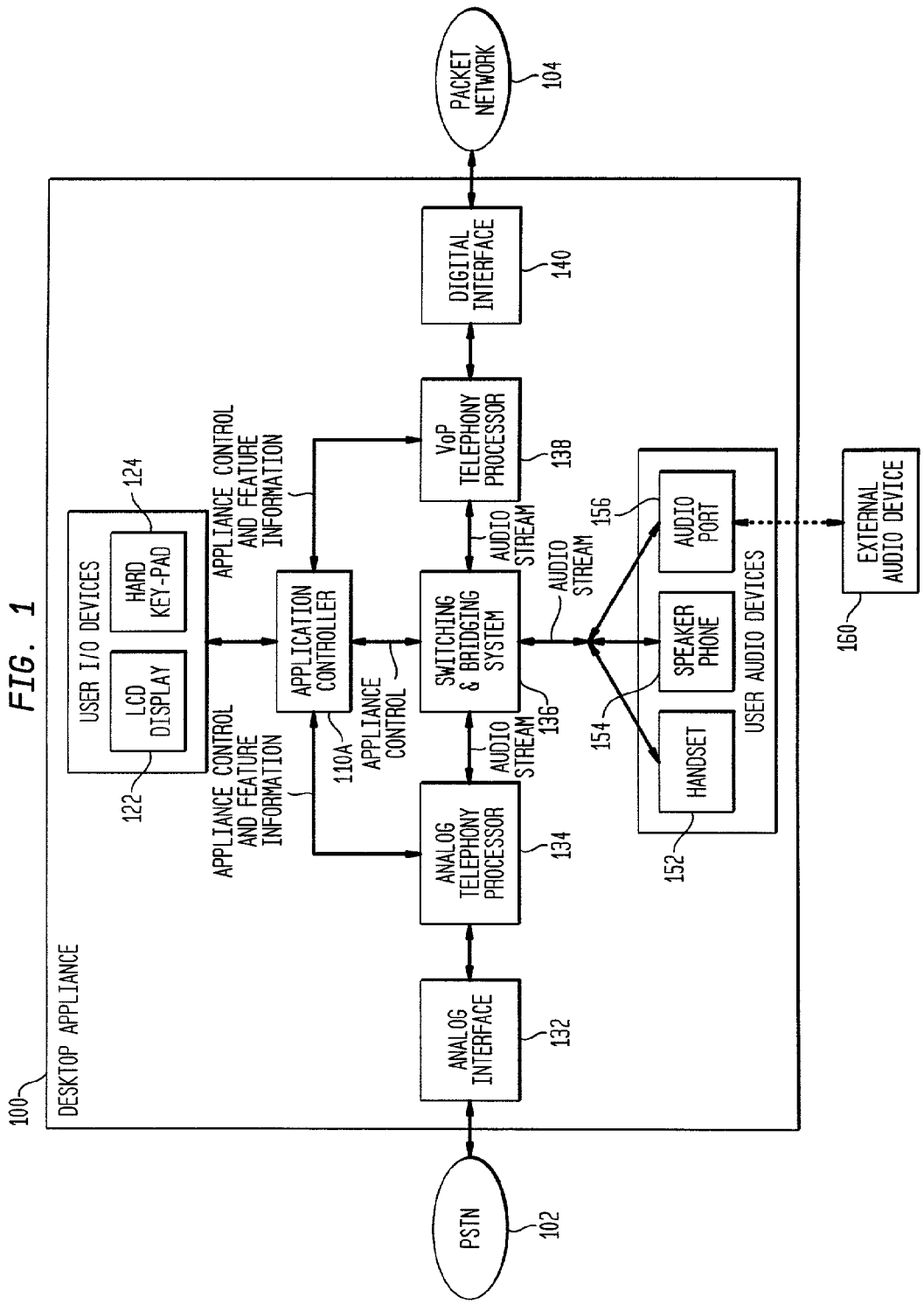
FIG. 1 is a simplified block diagram of a first illustrative embodiment of our invention wherein PSTN and VoP telephony functionality are incorporated into a single desktop appliance and the appliance provides for the interconnectivity of these functionalities.

FIG. 1 shows a simplified block diagram of desktop appliance 100, an integrated analog and VoP telephone configuration in accordance with an embodiment of our invention. Unlike the prior art, desktop appliance 100 is a single system containing both analog telephony and VoP telephony components, thereby allowing a user to place calls over PSTN 102 and packet network 104. Uniquely, these interactions are made through a single set of user I/O devices and user audio devices, thereby consolidating the plurality of duplicate equipment present in the prior art into a single device, freeing space and easing management. In addition, desktop appliance 100 uniquely "bridges" the PSTN and VoP interfaces at the desktop, thereby allowing a user to hold, transfer, and conference calls between the PSTN, VoP network, and user audio devices.

The analog side of desktop appliance 100 include analog interface 132, which provides standard access to PSTN 102, and analog telephony processor 134, which provides standard analog call control processing. The VoP half of the appliance includes digital interface 140, which provides access to packet network 104, and VoP telephony processor 138, which provides VoP call control processing and voice compression/decompression protocols as is typically required for packet-based voice communications. Note that digital interface 140 can vary depending on the specific mode used to access the packet network. For example, the digital interface will provide LAN functionality if the desktop appliance directly interfaces with a packet network. However, the desktop appliance may also access a packet network via an Internet Service Provider (ISP) in which case digital interface 140 will provide telephony modem functionality, DSL modem functionality, or cable modem functionality, etc. All audio originating from the PSTN and packet networks is routed to a switching and bridging system 136 for subsequent routing within the appliance. Similarly, all audio to be transmitted from the appliance is first passed through the switching and bridging system and subsequently routed towards the appropriate network interface.

The user I/O devices include hard keypad 124, for entering digits and controlling the appliance, and LCD display 122, for displaying dialed digits and feature-related call information. User audio devices include handset/headset 152 (hereinafter handset is used to infer either handset or headset), speakerphone 154, and audio port 156, the audio port allowing for external audio device 160, such as an answering machine, to be connected to the appliance.

Switching and bridging system 136 implements the unique consolidating and bridging functionality of the desktop appliance. Specifically, the switching and bridging system, as described further below, is a multi-port audio system interconnecting and/or bridging the analog interface, the digital interface, and the user audio devices. The switching functionality consolidates the user audio devices by allowing any device to be connected to each other or to either network interface. The bridging functionality allows the network interfaces and user audio devices to be simultaneously interconnected, creating conference type scenarios. The various types of connectivity are further described below.

Lastly, application controller 110A provides overall control of the desktop appliance 100. Specifically, based on user commands entered through the user I/O devices, the application controller configures and controls the PSTN and VoP telephony functionality, the switching and bridging system, and the user audio devices (control arrow not shown in figure). Similarly, the application controller relays feature based information received from the PSTN and VoP interfaces to the user I/O devices for display.

Figure 2:
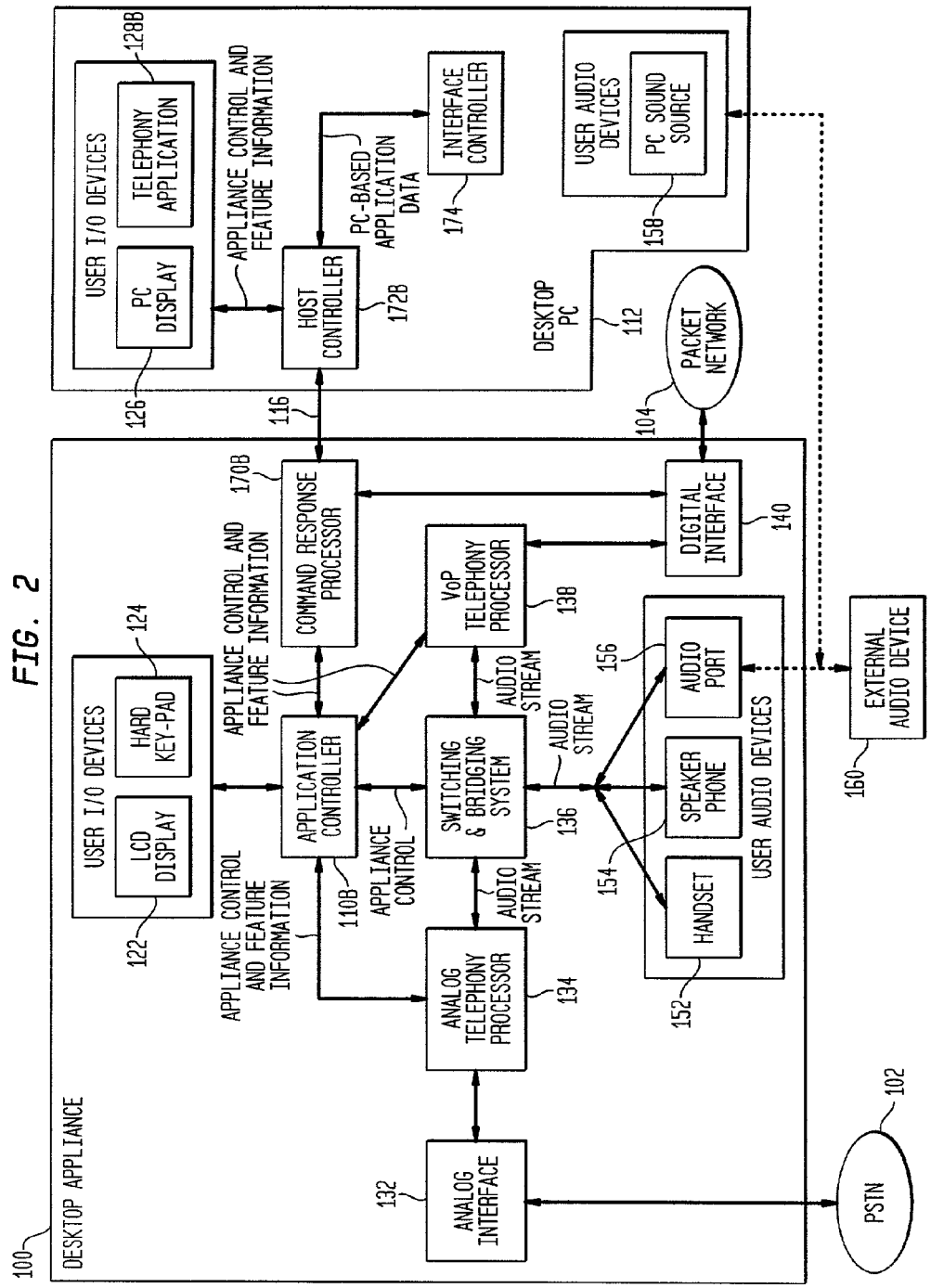
FIG. 2 is a simplified block diagram of a second illustrative embodiment of our invention where the desktop appliance is incorporated with a desktop PC, allowing for the appliance to provide network access for the PC and for the PC to provide advanced telephony applications for the appliance.

FIG. 2 shows a simplified block diagram of a second embodiment of our invention where desktop appliance 100 is now integrated with a user's desktop PC 112 through physical connection 116 (e.g., a serial connection(s)). In this embodiment the desktop appliance 100 continues to function as described above in FIG. 1 with the addition of two enhancements. First, digital interface 140 now provides both the desktop appliance 100 and the desktop PC 112 with access to packet network 104. As described above, digital interface 140 can vary depending on the type of packet network and the way in which this network is accessed. As such, desktop appliance can provide modem functionality for the PC, as an example. To allow PC-based user-applications to control and interact with digital interface 140, desktop PC also contains interface controller 174. For example, if digital interface 140 implements a modem, interface controller 174 is a traditional PC-based modem application. Command response processor 170B and host controller 172B are responsible for transferring data between the digital interface 140 and the interface controller 174. With respect to the second enhancement, the incorporation of the desktop PC allows for the development of advanced telephony applications to complement the functionality of the desktop appliance. In particular, the user I/O devices now also include PC display 126 and telephony application 128B, and the user audio devices now include PC sound source 158. As such, both the analog and VoP telephony functionality can be controlled and displayed through any of hard key-pad 124, telephony application 128B, LCD display 122, and PC display 126. Command response processor 170B and host controller 172B are responsible for transferring all telephony command and display information between the application controller 110B and PC. In addition, user audio devices 152–156 continue to provide an audio interface, however, audio port 156 can now be interfaced with PC sound source 158 to provide enhanced audio functionality.

Figure 3:
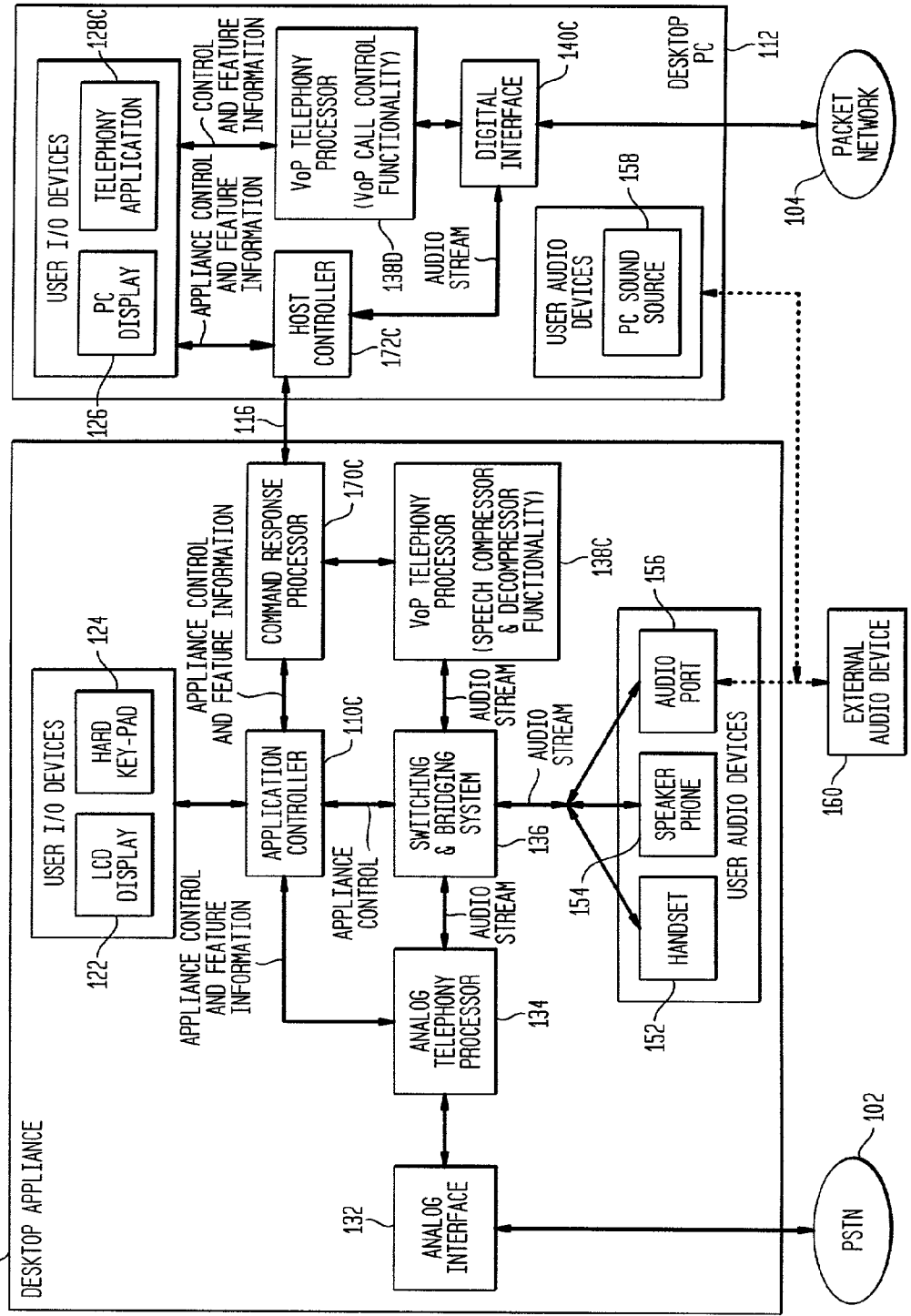
FIG. 3 is a simplified block diagram of a third embodiment of our invention where the packet network interface functionality and VoP call control functionality are provided by the desktop PC, rather than the desktop appliance.

FIG. 3 shows a simplified block diagram of a third embodiment of our invention where desktop appliance 100, similar to FIG. 2, is integrated with a user's desktop PC 112. The operation of this embodiment is similar to that in FIGS. 1 and 2. However, under this embodiment, the desktop appliance no longer contains a digital interface for communicating with the packet network; rather, the desktop PC's digital interface 140C is utilized. In addition, the VoP telephony processor 138C/138D is now split with VoP call control executing on the desktop PC and the speech compression and decompression executing on the desktop appliance. As such, the desktop appliance continues to handle all speech audio manipulation except for network transmission and reception, which are performed by the desktop PC. As with the embodiment shown in FIG. 2, both the analog and VoP telephony functionality can be controlled and displayed through any of hard key-pad 124, telephony application 128C, LCD display 122, and PC display 126. Command response processor 170C and host controller 172C are responsible for transferring control/feature information and audio samples between the desktop appliance and PC. In addition, user audio devices 152–156 continue to provide an audio interface for both analog and VoP telephony. Uniquely, the continued incorporation of switching and bridging system 136 within the desktop appliance allows for the consolidation of the plurality of user audio devices present in the prior art and for the conferencing and transferring of calls between the PSTN, VoP network, and user audio devices.

Figure 4:
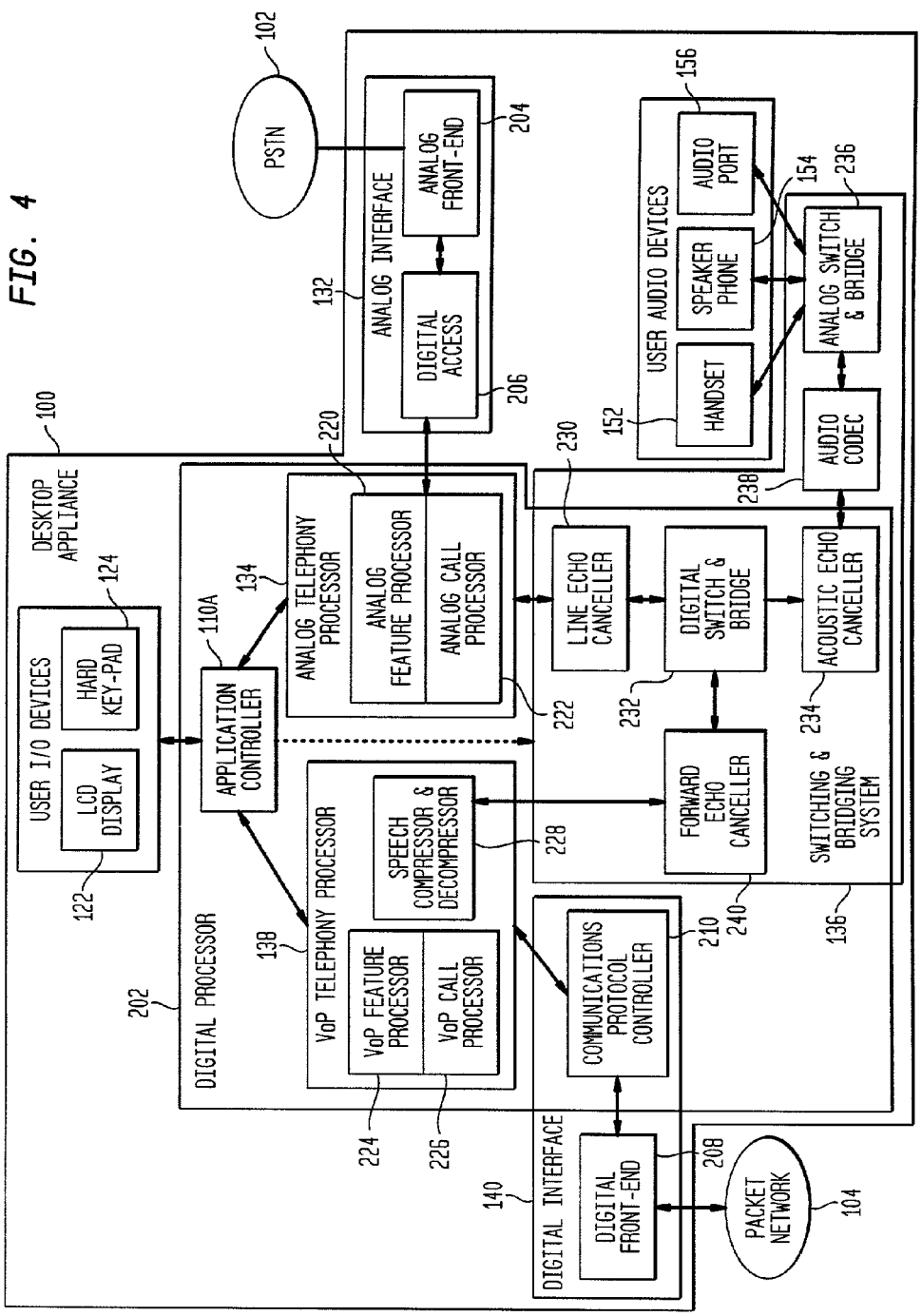
FIG. 4 is an expanded block diagram of the first embodiment of our invention.

Turning to a detailed description of the above embodiments, FIG. 4 shows an expanded block diagram of the first implementation of desktop appliance 100 as described above in FIG. 1. As seen in FIG. 4, the desktop appliance 100 is implemented through a combination of hardware and firmware modules. The firmware elements are implemented through digital-processor 202, such as Texas Instruments TMS320C5402, using digital signal processing (DSP) technology. Uniquely, under our invention, the analog call control, VoP call control, VoP audio compression/decompression, the requisite communication protocols, portions of the switching and bridging system, and the inclusion of echo cancellers are all implemented within firmware on a single processor. However, nothing precludes implementing the functional elements shown in FIG. 4 as either hardware or firmware, nor implementing the firmware elements across multiple processors.

Using FIG. 1 as a base reference, analog interface 132 is implemented through digital access 206 and analog front-end 204. Digital interface 140 is implemented through digital front-end 208 and communications protocol controller 210. The analog telephony processor 134 is implemented in the digital domain through firmware elements executing on digital processor 202. These analog firmware elements include analog call processor 222 and analog feature processor 220. Similarly, VoP telephony processor 138 is implemented in firmware through three elements including: VoP call processor 226, VoP feature processor 224, and speech compressor and decompressor 228. The switching and bridging system 136 is implemented through a combination of firmware and hardware elements including line echo canceller 230, digital switch and bridge 232, forward echo canceller 240, acoustic echo canceller 234, analog switch and bridge 236, and audio codec 238. User I/O devices, user audio devices, and the application controller 110A are as described above. The following will first describe the functionality of each element in FIG. 4 and then describe the interaction of these elements.

Analog front-end 204 provides physical analog access to PSTN 102. Specifically, this element provides line protection, on-hook signal access capability, hybrid functionality, analog power ringing, DC line termination, and line present/high sense functionality. This element can be implemented through discrete analog components, as is known in the art, or through an integrated circuit, such as the S13044 by Silicon Laboratories.

Digital access element 206 provides digital-to-analog/analog-to-digital conversions. As described above, the analog telephony functionality, including manipulation of the actual analog audio stream, operates in the digital domain. Digital access element 206 is responsible for converting all analog signals received from the PSTN network to digital pulse code modulation (PCM) signals for processing by the digital processor, and similarly, converting all PCM signals originating from the digital processor to analog signals. The signals processed by digital access 206 include: (1) audio signals (voice, music, etc.), (2) feature/Class service parameters originating from the PSTN, (3) call progress signals, ringing signals, and DTMF/dial pulse signals originating from the PSTN, and (4) DTMF and dial pulse signals generated by the user.

Digital access element 206 also performs intermediary functions between the analog front-end and the digital processor, such as reporting the status of analog front end 204 to the processor and configuring the analog front end under the control of the processor. An integrated circuit, such as the S13044 by Silicon Laboratories, can be used to provide the functionality of digital access element 206.

Digital access to the packet network is provided through a combination of digital front end 208, which provides the physical layers of the OSI stack (e.g., OSI layers 1–2), and communications protocol controller 210, a firmware module that provides the upper layers of the OSI stack (e.g., OSI layers 2–4). Note that the exact form of the digital front end and communications protocol controller depends on the proximity of desktop appliance 100 to the data network as indicated above. For example, enterprise applications of desktop appliance 100 may directly access a LAN, in which case, digital front-end 208 is a standard network interface card and communications protocol controller 210 provides layer 3+ type functionality. However, consumer applications of the desktop appliance, for example, may indirectly access a packet network over a PSTN network. In this latter example, digital front end 208 resembles analog interface 132 and would therefore comprise digital access 206 and analog front-end 204. Here, communications protocol controller 210 would provide telephony and modem functionality (e.g., ITU V.90, V.34, V.32bis, V.32). Access through the PSTN and a modem is further described below in FIG. 5 for clarity.

The user I/O devices, including LCD display 122 and hard keypad 124, and application controller 110A, allow a user to control desktop appliance 100. Specifically, LCD display 122 displays information such as dialed digits and feature service parameters (e.g., calling number/name, time, date, and message waiting indications, received from either network interface). A user controls desktop appliance 100 through hard keypad 124, which includes a DTMF keypad along with hold, speakerphone, conference-call, call-transfer, and mute buttons. These control commands, in addition to line-hold and handset line-use commands, are received by application controller 110A, which subsequently controls and configures analog telephony processor 134, VoP telephony processor 138, switching and bridging system 136, and the user audio devices (the control lines are not shown in the Figure).

Analog call processor 222 and analog feature processor 220 provide the core analog telephony functionality, including execution of PSTN origination/termination call models and feature processing. Using DSP technology, analog call processor 222 generates and detects signals in order to execute the call models and features. Specifically, based on requests received from application controller 110A as entered by a user via hard key pad 124, the analog call processor generates DTMF or dial-pulse signals for the purpose of dialing and feature interaction. The analog call processor transmits these signals to digital access 206 for conversion to analog signals and subsequent issuing to the PSTN network as described above. Similarly, analog call processor 222 detects and discriminates among DTMF signals, call progress signals (including dial tone, recall dial tone, message waiting indicator tone, audible ringing, line busy tone, reorder tone), and ringing signals (including normal ringing, coded ringing, distinctive ringing, special ringing, and reminder ring) received from the PSTN network. These signals are subsequently reported to the user by generating an audible signal to the speaker phone, as an example.

With respect to feature processing, analog call processor 222 performs Type 1 (i.e., on-hook) and Type 2 (i.e., off-hook) CPE functions for the GR-30-CORE voiceband data transmission interface in order to discern and receive feature-based data. Type 1 functions include the detection of on-hook FSK signals, with and without power ringing, and message parsing. Type 2 functions include detecting and acknowledging the CPE alerting signal (CAS), detecting off-hook FSK, and message parsing. With respect to Type 2 functions, the analog call processor uses the near-end echo canceller 230 to reduce the possibility of near-end talkoff. Once a message is received, analog call processor 222 forwards the message to analog feature processor 220, which extracts the service parameters and presents them to the user (e.g., through LCD display 122). Supported service parameters include date and time, calling number, calling name, visual message waiting indicator, wireless SMS, dialable directory number, call qualifier, calling number reason for absence, and calling name reason for absence.

VoP call processor 226, speech compressor and decompressor 228, and VoP feature processor 224 provide the core VoP telephony functionality. VoP call processor 226 is responsible for call origination/termination using a VoP-based call control protocol such as H.323, SIP, and MGCP. Based on digits/commands received from application controller 110A as entered by the user via hard key-pad 124, VoP call processor 226 formulates and transmits call-processing messages to the packet network via communications protocol controller 210 and digital front-end 208. Similarly, the VoP call processor processes call control messages received from the network. As indicated above, desktop appliance may be indirectly connected to a packet network, such as through a modem and internet service provider. Under these circumstances, VoP call processor 226 may also be responsible for establishing the initial connection to the data network, prior to call processing. (Note that the application software required to establish the initial connection could be situated in the communications protocol controller, VoP telephony processor, or in an independent element). Finally, VoP call processor 226 passes all feature based service parameters to VoP feature processor 224 where the information is processed and presented to the user (e.g., through LCD display 122).

As is known in the art, digital audio is transmitted over a packet network in a compressed form for efficiency purposes. Speech compressor and decompressor 228 compresses all audio prior to being transmitted by communications protocol controller 210 to the packet network. Similarly, this element decompresses all audio received from the packet network prior to that audio being processed by the digital processor. Speech compressor and decompressor 228 can utilize various compression/decompression algorithms including ITU G.711, G.723, G.728, and G.729.

The final components of desktop appliance 100 implement switching and bridging system 136, which, as described above, is a multi-port audio system interconnecting and/or bridging the PSTN network, the packet network, and the user audio devices. This switching and bridging occurs both in the analog domain (for the purpose of the user audio devices) through analog switch and bridge 236, and in the digital domain through digital switch and bridge 232. Audio codec 238 interconnects the digital and analog domains, converting between the analog and PCM signals emanating from the two networks and the user audio devices. Audio codec 238 can be implemented through an integrated circuit such as the SI3044 by Silicon Laboratories.

Analog switch and bridge 236 is a four port analog system that interconnects handset 152, speakerphone 154, audio port 156, and the analog audio stream emanating from digital switch and bridge 232 through audio codec 238. Under the control of hard keypad 124 and application controller 110A, the analog switch and bridge 236 provides switching functions (interconnecting any two points) and bridging functions (bridging any combination of three or more points). The logical design of analog switch and bridge 236 is further described below.

Digital switch and bridge 232 is a three port digital system that interconnects the audio stream from the PSTN network, the audio stream from the VoP network, and the digital audio stream emanating from analog switch and bridge 236 through audio codec 238. Under the control of hard keypad 124 and application controller 110A, the digital switch and bridge provides switching functions (interconnecting any two points) and bridging functions (bridging all three points). The logical design of digital switch and bridge 232 is further described below.

Line echo canceller 230, acoustic echo canceller 234, and forward echo canceller 240 are adaptive echo cancellers (Note that these three echo cancellers are highly desirable but are not required to implement switching and bridging system 136 nor the desktop appliance in general.) Line echo canceller 230 removes echo produced by the near end hybrid situated in analog interface 132 and produced by the PSTN network. Forward echo canceller 240 is operative when the desktop appliance is interfaced to a far-end speakerphone via the packet network. In this case, the forward echo canceller removes residual echo produced by the far-end speakerphone. Acoustic echo canceller 234 is operative when speakerphone 154 is employed. This echo canceller allows the speakerphone to operate in full duplex mode for PSTN and packet network audio transactions by removing speaker phone induced acoustic echo.

Figure 5:
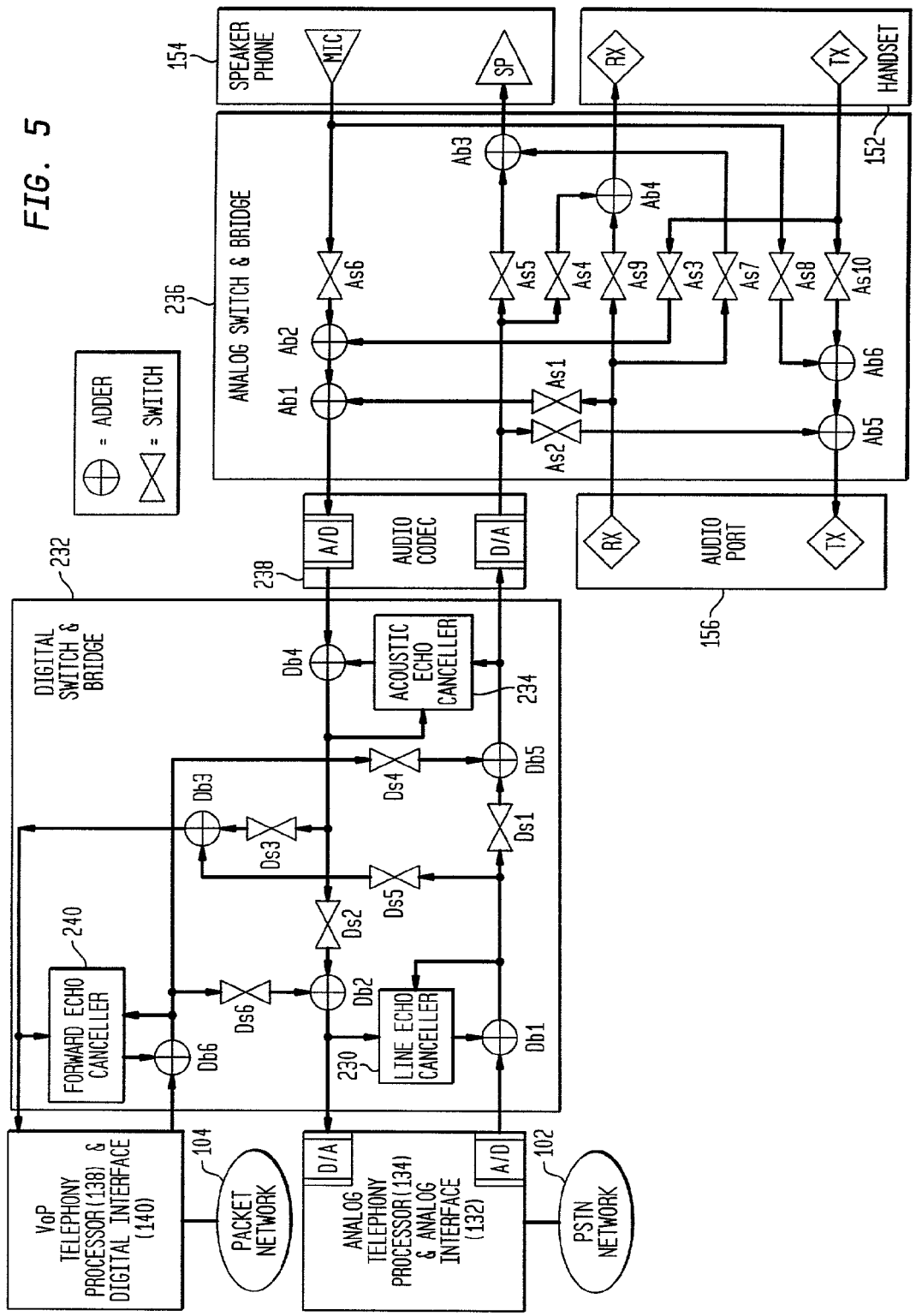
FIG. 5 is a logical connectivity diagram of an illustrative switching and bridging system provided by a desktop appliance in accordance with our invention.

FIG. 5 shows a logical connectivity diagram of switching and bridging system 126, where Ds1–Ds6 represent digital switches, As1–As10 represent analog switches, Db1–Db6 represent digital adders, and Ab1–Ab6 represent analog adders. Table 1 shows the combinations of switching and conferencing connectivity that can be achieved through the system: column one showing the connectivity combinations, column two showing the digital and analog switch closures needed to accomplish each combination, and column three indicating whether line echo canceller 230, acoustic echo canceller 234, and/or forward echo canceller 240 are utilized in the given combination (note that the forward echo canceller is only employed if there is a far-end speaker phone being used). For example, any of the user audio devices can be connected to a single network. Similarly, both networks and any user audio device can be bridged to establish a conference call. In addition, the desktop appliance can act as a gateway, simply bridging the PSTN and packet networks.

TABLE 1

Desktop Appliance Connectivity Chart

| Type of Connectivity | Switch Closures (Default open) | Type of Echo Cancellation Utilized |
| --- | --- | --- |
| Single Two Way Connectivity | | |
| PSTN Network & Handset | Ds1, Ds2, As3, As4 | Line Echo Canceller |
| PSTN Network & Speakerphone | Ds1, Ds2, As5, As6 | Line Echo Canceller & Acoustic Echo Canceller |
| PSTN Network & Audio Port | Ds1, Ds2, As1, As2 | Line Echo Canceller |
| Packet Network & Handset | Ds3, Ds4, As3, As4 | Forward Echo Canceller |
| Packet Network & Speakerphone | Ds3, Ds4, As5, As6 | Acoustic Echo Canceller & Forward Echo Canceller |
| Packet Network & Audio Port | Ds3, Ds4, As1, As2 | Acoustic Echo Canceller & Forward Echo Canceller |
| Audio Port & Handset | As9, As10 | None |
| Audio Port & Speakerphone | As7, As8 | None |
| PSTN Network & Packet Network | Ds5, Ds6 | Line Echo Canceller & Forward Echo Canceller |
| Single Three Way Connectivity | | |
| PSTN Network, Packet Network, & Speakerphone | Ds1, Ds2, Ds3, Ds4, Ds5, Ds6, As5, As6 | Line Echo Canceller, Acoustic Echo Canceller, & Forward Echo Canceller |

TABLE 1-continued

Desktop Appliance Connectivity Chart

| Type of Connectivity | Switch Closures (Default open) | Type of Echo Cancellation Utilized |
| --- | --- | --- |
| PSTN Network, Packet Network, & Handset | Ds1, Ds2, Ds3, Ds4, Ds5, D6, As3, As4 | Line Echo Canceller & Forward Echo Canceller |
| PSTN Network, Packet Network, & Audio Port | Ds1, Ds2, Ds3, Ds4, Ds5, Ds6, As1, As2 | Line Echo Canceller & Forward Echo Canceller |
| PSTN Network, Audio Port, & Handset | Ds1, Ds2, As1, As2, As3, As4, As9, As10 | Line Echo Canceller |
| PSTN Network, Audio Port, & Speakerphone | Ds1, Ds2, As1, As2, As5, As6, As7, As8 | Line Echo Canceller & Acoustic Echo Canceller |
| Packet Network, Audio Port, & Handset | Ds3, Ds4, As1, As2, As3, As4, As9, As10 | Forward Echo Canceller |
| Packet Network, Audio Port, & Speakerphone | Ds3, Ds4, As1, As2, As5, As6, As7, As8 | Acoustic Echo Canceller & Forward Echo Canceller |
| Single Four Way Connectivity | | |
| PSTN Network, Packet Network, Audio Port, & Handset | Ds1, Ds2, Ds3, Ds4, Ds5, Ds6, As1, As2, As3, As4, As9, As10, | Line Echo Canceller & Forward Echo Canceller |
| PSTN Network, Packet Network, Audio Port, & Speakerphone | Ds1, Ds2, Ds3, Ds4, Ds5, Ds6, As1, As2, As5, As6, As7, As8 | Acoustic Echo Canceller, Line Echo Canceller, & Forward Echo Canceller |
| Dual Two Way Connectivity | | |
| (PSTN Network & Handset) and (Audio Port & Speakerphone) | (Ds1, Ds2, As3, As4) and (As7, As8) | Line Echo Canceller |
| (PSTN Network & Speakerphone) and (Audio Port & Handset) | (Ds1, Ds2, As5, As6) and (As9, As10) | Line Echo Canceller & Acoustic Echo Canceller |
| (Packet Network & Handset) and (Audio Port & Speakerphone) | (Ds3, Ds4, As3, As4) and (As7, As8) | Line Echo Canceller & Forward Echo Canceller |
| (Packet Network & Speakerphone) and (Audio Port & Handset) | (Ds3, Ds4, As5, As6) and (As9, As10) | Acoustic Echo Canceller & Forward Echo Canceller |
| (PSTN Network & Packet Network) and (Audio Port & Handset) | (Ds5, Ds6) and (As9, As10) | Line Echo Canceller & Forward Echo Canceller |
| (PSTN Network & Packet Network) and (Audio Port & Speakerphone) | (Ds5, Ds6) and (As7, As8) | Line Echo Canceller & Forward Echo Canceller |
| Dual Two & Three Way Connectivity | | |
| (PSTN Network, Packet Network, & Handset) and (Audio Port & Speakerphone) | (Ds1, Ds2, Ds3, Ds4, Ds5, Ds6, As3, As4) and (As7, As8) | Line Echo Canceller & Forward Echo Canceller |
| (PSTN Network, Packet Network, & Speakerphone) and (Audio Port & Handset) | (Ds1, Ds2, Ds3, Ds4, Ds5, Ds6, As3, As4) and (As9, As10) | Line Echo Canceller, Acoustic Echo Canceller, & Forward Echo Canceller |

Figure 6:
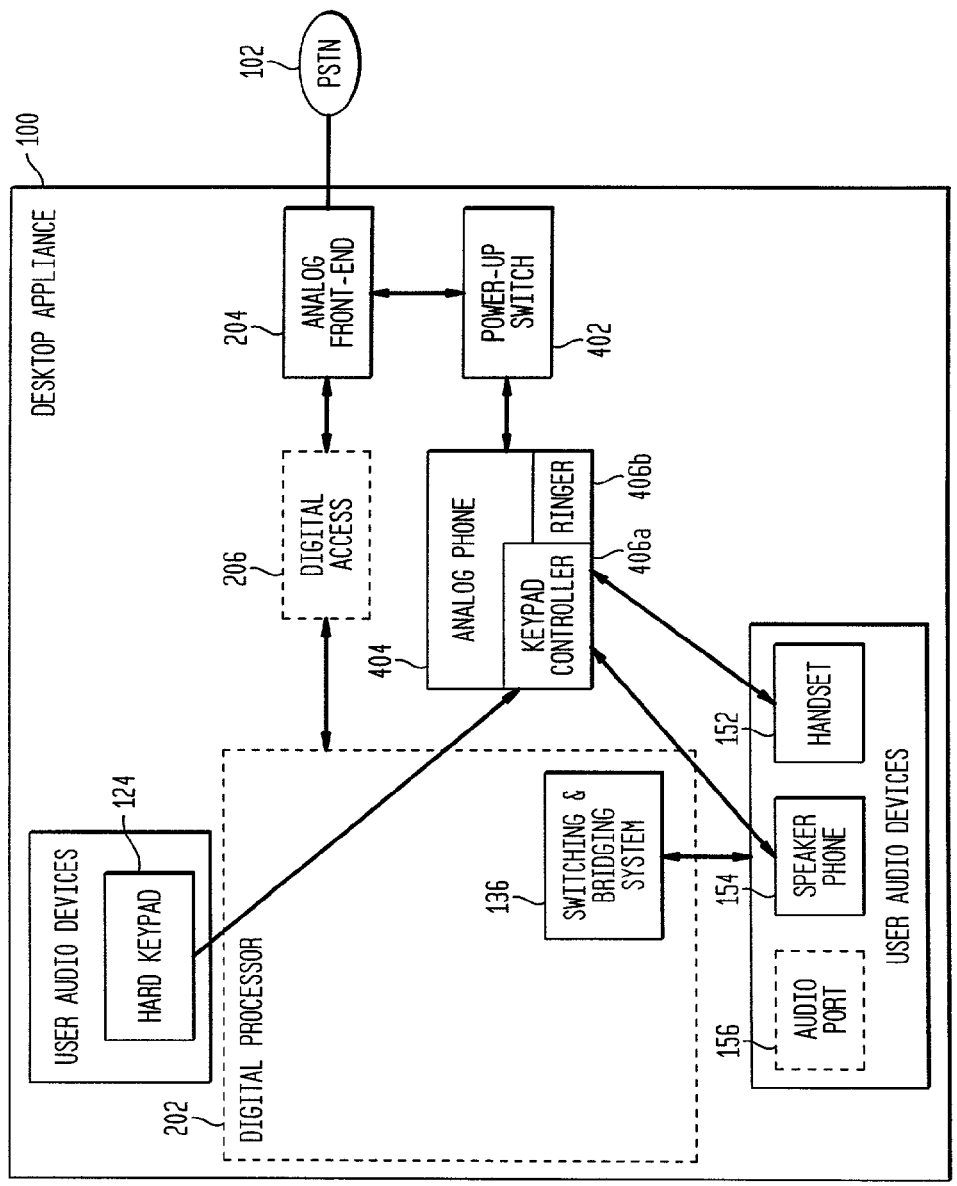
FIG. 6 depicts an illustrative block diagram of a back-up power fail system provided by a desktop appliance under our invention.

Desktop appliance 100 typically requires AC power in order to function and therefore becomes inoperative if power is lost. The loss of basic telephony functionality is addressed through a "back-up power fail system" as shown in FIG. 6 (FIG. 6 is a simplified version of FIG. 4, showing only the elements needed to implement the back-up power fail system). Specifically, if power is lost, power-up switch 402 connects the PSTN analog interface, and the corresponding analog line-power, to analog phone 404, which provides basic telephony functionality. The implementation of analog phone 404 is known in the art. The analog phone also includes an independent keypad controller 406a, interfaced to hard key-pad 124 for control, and an independent ringer 406b. Human interface to analog phone 404 is provided through handset 152 or optionally, speakerphone 154.

Figure 7:
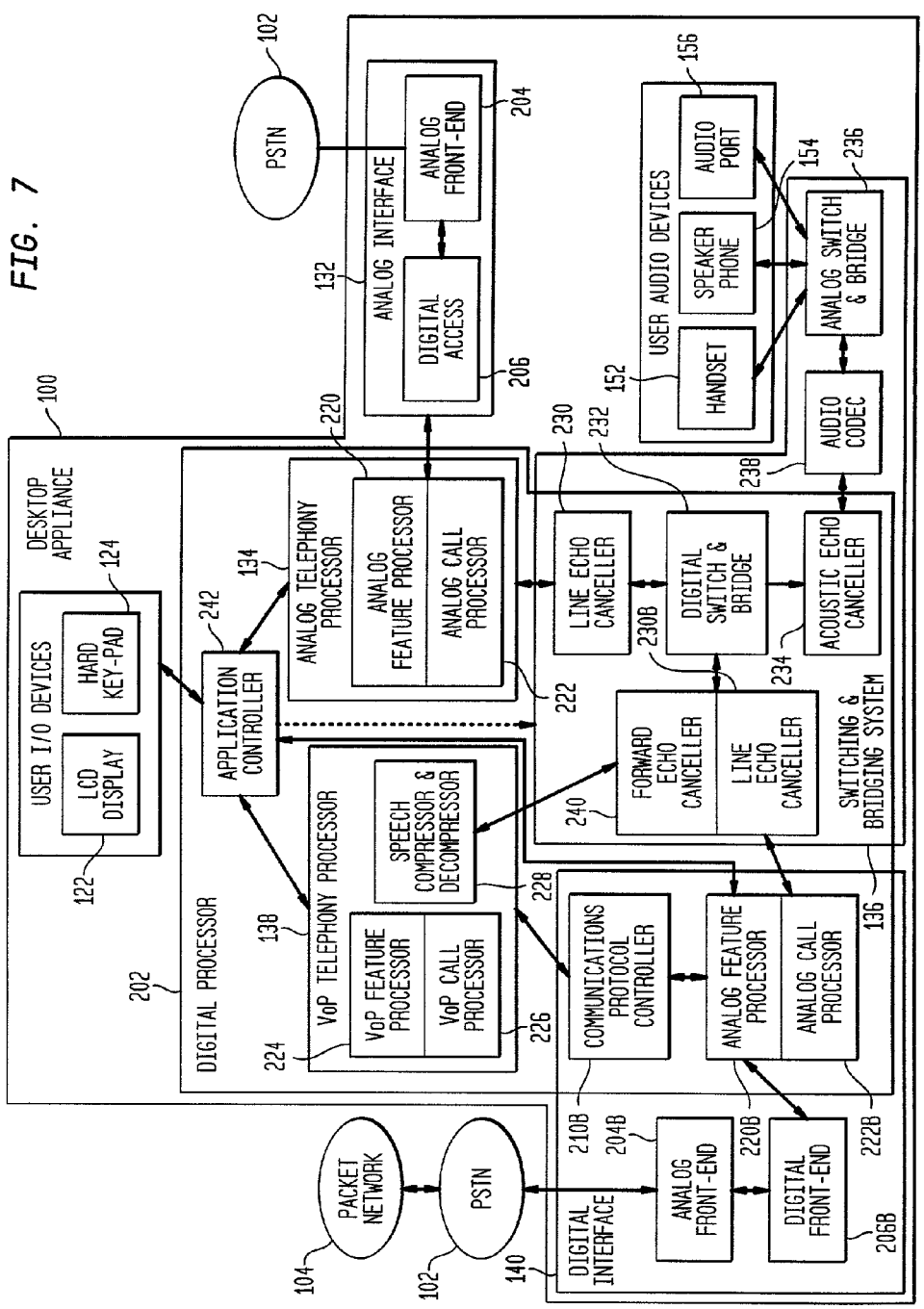
FIG. 7 further depicts the first embodiment of our invention wherein the desktop appliance accesses the packet network through the PSTN and modem interface.

As mentioned above, desktop appliance 100 as described in FIG. 4, can indirectly access the packet network over the PSTN network through a modem. FIG. 7 shows an even more detailed functional drawing of this embodiment. As shown, the digital interface 140 now resembles the analog interface described above. Specifically, analog front-end 204B, digital access 206B, and analog call processor 222B provide dial-in access to the PSTN network and, as an example, an ISP's modem pool. Communications protocol controller 210B provides the required modem functionality (e.g., ITU V.90, V.34, V. 32bis, V.32), including a line echo canceller to deal with echo produced by the PSTN and near end hybrid, and the upper layers of the OSI stack. If necessary, application software required to communicate with an ISP can be situated in the communications protocol controller, VoP Telephony Processor, or through an independent element. Besides the addition of the analog interface, the desktop appliance continues to function as described above with respect to the VoP and analog telephony functionality, and the switching and bridging functionality as described in FIG. 5 and Table 1.

However, because the appliance now contains a second PSTN interface, a user can bypass the VoP telephony functionality and communications protocol controller and treat interface 140 not as a digital data interface, but rather as a standard analog interface providing access to PSTN 102 as described above for the first analog interface. As such, desktop appliance 100, under this embodiment, has two modes—the first mode being a two-line phone with one interface being VoP and the second interface being analog, and the second mode being a two-line analog phone (the two modes being controlled by application controller 242). When the second PSTN interface is used for voice calls, line echo canceller 230B is employed, similar to line echo canceller 230, and forward echo canceller 240 is disabled. The unique connectivity functionality also holds for this embodiment and is similar to FIG. 5 and Table 1 (e.g., the forward echo canceller 240 is replaced with line echo canceller 230A, etc. in FIG. 5, and PSTN network replaces packet network in Table 1).

Figure 8:
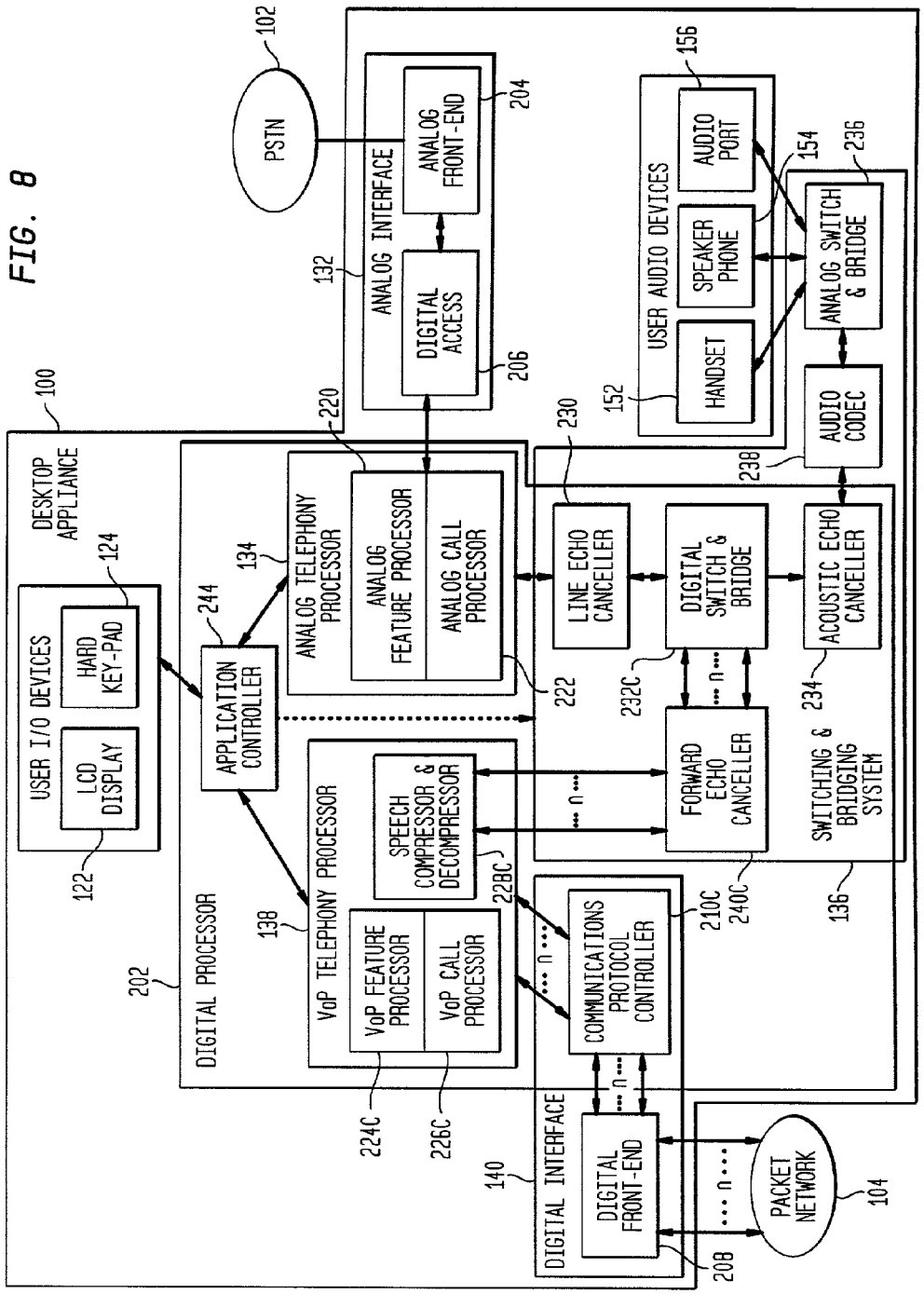
FIG. 8 further depicts the first embodiment of our invention wherein the desktop appliance controls multiple simultaneous VoP calls.

Because a packet network simultaneously multiplexes multiple transactions, desktop appliance 100 as described above in FIGS. 4 and 7 can also be expanded to support multiple VoP calls. This embodiment is shown in FIG. 8. Under this embodiment, multiple VoP audio streams are controlled (originated and terminated) by VoP call processor 226C and VoP feature processor 224C, and by hard keypad 124 and application controller 244. Each audio stream is transmitted and received through digital front end 208 and communications protocol controller 210C, compressed/decompressed by speech compressor and decompressor 228C, and passed through switching and bridging system 136. However, digital switch and bridge 232C must be enhanced to support interconnectivity amongst the plurality of VoP audio streams, the PSTN interface, and the user audio devices (similarly, the forward echo canceller 240C must be enhanced). Such an enhancement is an extrapolation of FIG. 5 and Table 1. Hence, as an example, desktop appliance 100 can connect any one of the VoP audio streams to a user audio device, conference multiple VoP streams with the PSTN network and a user audio device, and act as a gateway to bridge multiple VoP calls. Also note that digital interface 140 can be an analog interface as described in FIG. 7, providing both an analog phone mode and a modem mode, with the modem mode supporting the multiple VoP calls.

Figure 9:
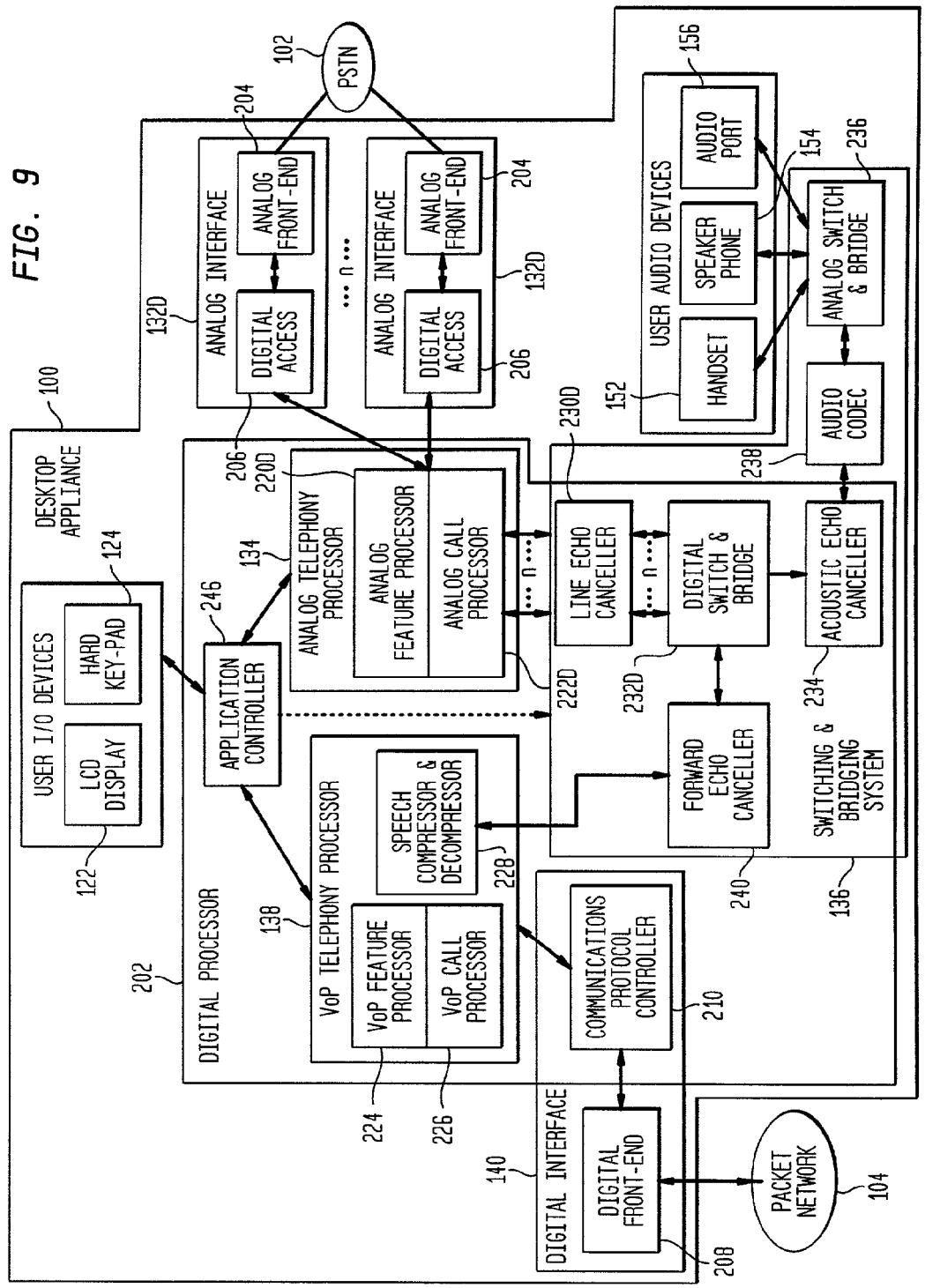
FIG. 9 further depicts the first embodiment of our invention wherein the desktop appliance provides multiple analog interfaces to the PSTN and supports multiple simultaneous analog calls.

In addition to the single digital interface 140 and the single analog interface 132 (as described in FIGS. 4, 7, and 8) desktop appliance 100 can also be expanded to support a plurality of analog interfaces to the PSTN as shown in FIG. 9. Under this embodiment, multiple analog interfaces 132D must be physically added to the appliance. Similarly, application controller 246, analog call processor 222D, analog feature processor 220D, line echo canceller 230D, and digital switch and bridge 232D must be enhanced to support the additional interfaces. (Again, FIG. 5 and Table 1 can be extrapolated for this embodiment). Note also that the functionality of desktop appliance 100 as described in the FIG. 8 embodiment can be combined with the functionality as described in this FIG. 9 embodiment.

Figure 10:
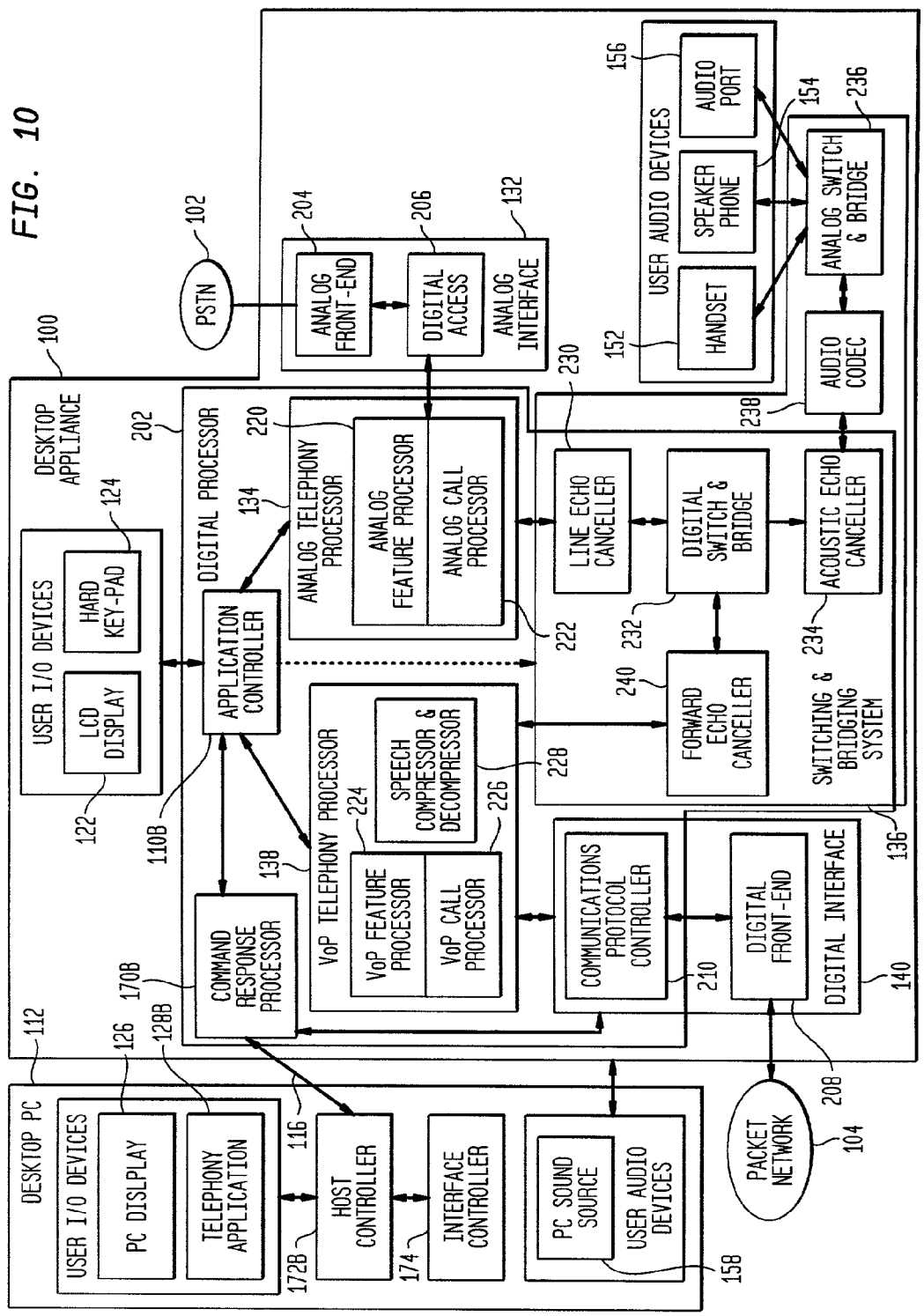
FIG. 10 is an expanded block diagram of the second embodiment of our invention.

FIG. 10 is an expanded block diagram of the implementation of desktop appliance 100 as described in FIG. 2. Desktop appliance 100 continues to function as described above, however, the appliance is now also integrated with desktop PC 112. Under this embodiment, desktop appliance 100 provides the desktop PC with access to the packet network and the desktop PC provides the desktop appliance with advanced telephony applications.

Desktop appliance 100 and desktop PC 112 are interconnected through a physical interface 116, command response processor 170B, and host controller 172B. Physical interface 116 can be, for example, one or more serial interface connections. Command response processor 170B and host controller 172B are driver type modules that coordinate communications between the two systems. Through this interconnection and the interface controller 174 (which is an interface driver for digital interface 140) generic applications residing on desktop PC are able to interface with digital interface 140 and establish communications with the packet network. As a result, desktop appliance appears, for example, as a modem to desktop PC 112. In addition, the interconnection of the two systems, in conjunction with PC display 124 and telephony application 128B, provides an alternate way to control the analog and VoP telephony functionality and to display related call information.

In addition, audio port 156 can be connected to the desktop PC's PC sound source 158 through a serial port, for example. This interconnection allows for the development of additional PC-based applications, such as an answering machine.

The logical connectivity diagram of switching and bridging system 120 shown in FIG. 5 and the corresponding connectivity combinations shown in Table 1 also hold for this second embodiment. In addition, the back-up power fail system as shown in FIG. 6 also holds for this embodiment. Lastly, the functionality described in the FIGS. 7–9 embodiments can be similarly applied to this embodiment.

Figure 11:
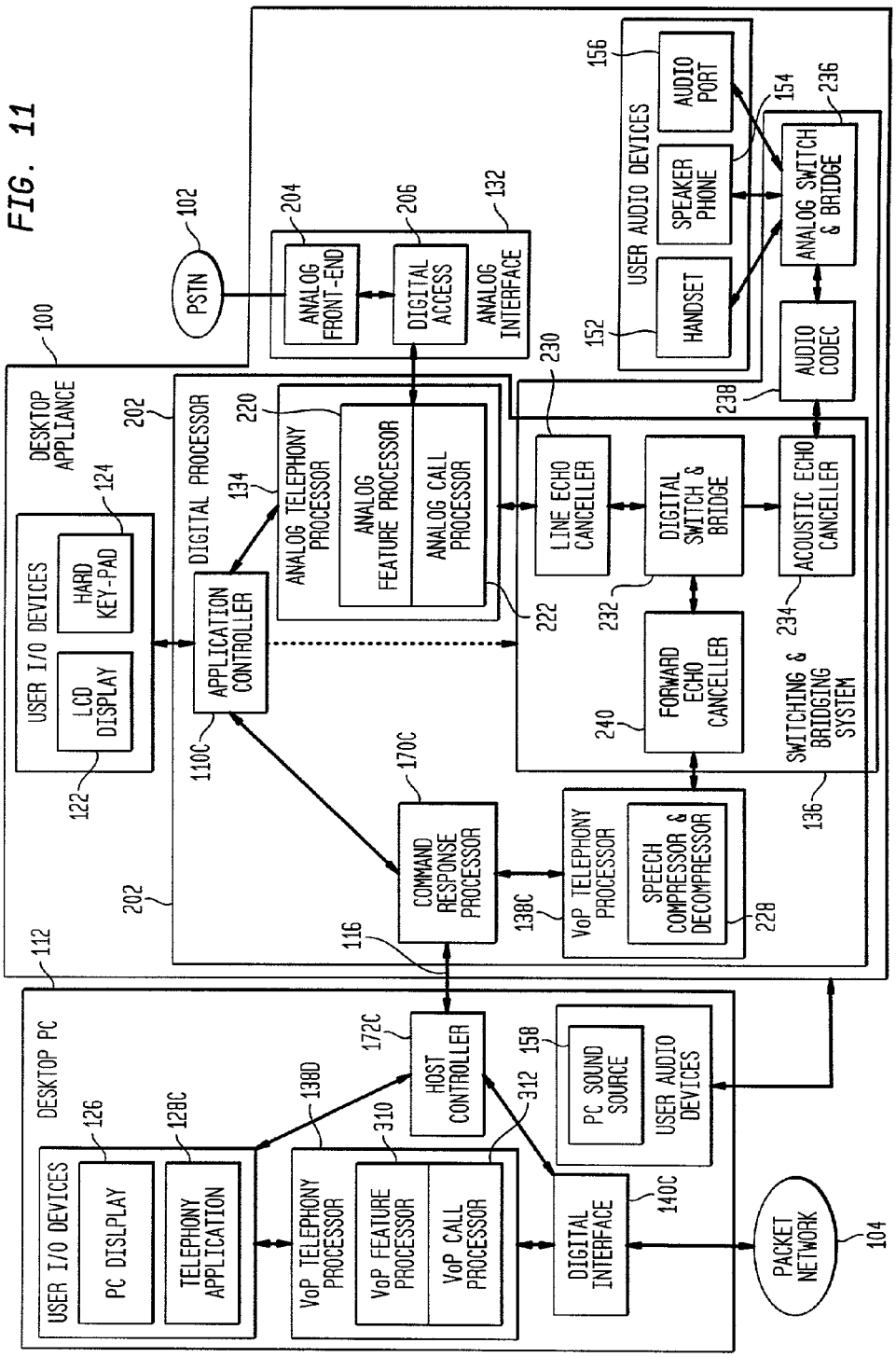
FIG. 11 is an expanded block diagram of the third embodiment of our invention.

FIG. 11 is an expanded block diagram of the implementation of desktop appliance 100 as described in FIG. 3. Desktop appliance 100 continues to function as described above. However, under this embodiment, the desktop appliance no longer directly interfaces to the packet network.

This functionality is provided through the desktop PC. In addition, the VoP telephony functionality is now split with VoP feature processor 310 and VoP call processor 312 executing on the desktop PC and the speech compressor and decompressor continuing to execute on the desktop appliance.

Under this configuration, a user can continue to control and display both the analog and VoP telephony functionality through hard-key-pad 124, telephony application 128C, LCD display 122, and PC display 124. In addition, all analog and VoP user audio interactions are through the user audio devices as above. The difference, as compared to the above embodiments, is that the VoP call processing executes on the PC and all audio transmitted and received by the desktop appliance pass through the PC's digital interface 140C, host controller 172C, physical interface 116, and command response processor 170C.

Uniquely, all audio continues to pass through switching and bridging system 136, which allows the audio devices, packet network, and PSTN network to be interconnected. The logical connectivity diagram of switching and bridging system 136 and the corresponding connectivity combinations are the same as shown in FIG. 5 and Table 1. In addition, back-up power fail system as shown in FIG. 6 also holds for this embodiment. Lastly, the functionality described in the FIGS. 8 and 9 embodiments can be similarly applied to this embodiment. In particular, with respect to multiple VoP telephony audio streams, the desktop PC would provide the call control and the desktop appliance would provide speech compression/decompression and the interconnectivity of the streams amongst each other, the PSTN network, and the user audio devices.

The above-described embodiments of our invention are intended to be illustrative only. Numerous other embodiments may be devised by those skilled in the art without departing from the spirit and scope of our invention.

We claim:

1. An integrated customer premise system for connection to both an external analog telephone network and to a digital packet network for conducting to a customer's audio equipment both analog telephone calls from the external analog telephone network and voice-over-packet (VoP) telephone calls from the digital packet network, said system comprising
    an analog call processor,
    an analog interface connecting the analog telephone calls from the external analog telephone network to said analog call processor,
    a VoP call processor,
    a digital interface for connecting the VoP telephone calls from the external packet network to said VoP call processor;
    a plurality of customer audio devices for use in either an analog telephone call from the external analog telephone network or a digital VoP telephone call from the external packet network, and
    a switching and bridging system connected to said analog call processor and said VoP call processor for connecting one or both of said analog and digital VoP telephone calls to said customer audio devices.

2. The integrated customer premise system in accordance with claim 1 wherein said digital interface provides one of LAN functionality and modem functionality.

3. The integrated customer premise system in accordance with claim 1 wherein said analog interface includes an analog front-end and a digital access and said digital interface includes a digital front-end and a communications protocol controller.

4. The integrated customer premise system in accordance with claim 3 wherein said switching and bridging system includes an analog switch and bridge, an audio codec, and a digital switch and bridge.

5. The integrated customer premise system in accordance with claim 4 wherein said switching and bridging system further includes a plurality of echo cancellers.

6. An integrated customer premise system for connection both to an external analog telephone network and to a digital packet network for conducting both analog and voice-over packet (VOP) telephone calls in the same customer premises system, said system comprising
    an analog call processor,
    an analog interface connecting telephone calls from the external telephone network to said analog call processor,
    a VoP call processor,
    a digital interface for connecting VoP telephone calls from the external packet network to said analog call processor,
    a plurality of customer audio devices for use in either an analog telephone call from the external analog telephone network or a digital telephone call from the external packet network, and
    a switching and bridging system connected to said analog call processor and said VoP call processor for connecting one or both of said analog and digital VoP telephone calls to said customer audio devices, said switching and bridging system including an analog switch and bridge, an audio codec, a digital switch and bridge, and a plurality of echo cancellers and
    wherein said echo cancellers include forward echo cancellers.

7. An integrated customer premise system for connection to both an external analog telephone network and to a digital packet network for conducting both analog and voice-over-packet (VoP) telephone calls in the same customer premise system, said system comprising
    an analog call processor,
    an analog interface connecting telephone calls from the external analog telephone network to said analog call processor,
    a VoP call processor,
    a plurality of customer audio devices for use in either an analog telephone call from the external analog telephone network or a digital VoP telephone call from the external packet network, and
    a switching and bridging system connected to said analog call processor and said VoP call processor for connecting one or both of said analog and digital VoP telephone calls to said customer audio devices, said switching and bridging system including an analog switch and bridge, an audio codec, and a digital switch and bridge and
    wherein said analog switch and bridge includes switch elements connected to individual of said customer audio devices and adder elements interconnecting said customer audio devices and said digital switch and bridge includes switch elements and adder elements interconnecting said analog call processor and said VoP call processor.

8. An integrated customer premise system for connection to both an external analog telephone network and to a digital packet network for conducting both analog and voice-overpacket (VoP) telephone calls in the same customer premise equipment, said system comprising an analog interface connecting telephone calls from the external analog telephone network to said analog call processor, a VoP call processor, a digital interface for connecting VoP telephone calls from the external packet network to said VoP call processor, a plurality of customer audio devices for use in either an analog telephone call from the external analog telephone network or a digital VoP telephone call from the external packet net work, and a switching and bridging system connected to said analog call processor and said VoP call processor for connecting one or both of said analog and digital VoP telephone calls to said customer audio devices, said switching and bridging system including an analog switch and bridge, an audio codec, and a digital switch and bridge and wherein said audio codec interconnects said analog switch and bridge and said digital switch and bridge.

9. An integrated customer premise system for connection to both an external analog telephone network and to a digital packet network for conducting both analog and voice-over-packet (VoP) telephone calls in the same customer premise system, said system comprising an analog call processor, an analog interface connecting telephone calls from the external analog telephone network to said analog call processor, a VoP call processor, a digital interface connecting VoP telephone calls from the external packet network to said VoP call processor, a plurality of customer audio devices for use in either an analog telephone call from the external analog telephone network or a digital VoP telephone call from the external packet network, a switching and bridging system connected to both said analog call processor and said VoP call processor for connecting one or both of said analog and digital VoP telephone calls to said customer audio devices, said switching and bridging system including an analog switch and bridge, an audio codec, and a digital switch and bridge, and customer input/output devices and an application controller connected to said input/output devices and to said analog call processor and said VoP call processor.

10. The integrated customer premise system in accordance with claim 7 wherein a plurality of VoP telephone calls are transmitted simultaneously and received through said digital front end and said VoP call processor, said VoP call processor including a speech compressor and decompressor.

11. The integrated customer premise system in accordance with claim 7 further comprising a plurality of analog interfaces connected to said analog call processor.

12. In combination, an integrated customer premise system for connection to both an external analog telephone network and to a digital packet network for conducting both analog and voice-over-packet (VoP) telephone calls in the same customer premise system, said system comprising a digital processor including an analog call processor, a VoP call processor, and a command response processor;

interfaces connecting telephone calls from the external analog telephone network to said analog call processor and for connecting VoP telephone calls from the external packet network to said VoP call processor;

a plurality of customer audio devices; and a switching and bridging system connected to said analog call processor and said VoP call processor for connecting one or both of said analog and digital telephone calls to said customer audio devices; and a computing device connected to said command response processor, whereby said computing device obtains access to said digital packet network through said command control processor, said computing device including a host controller connected through an interface to said command control processor.

13. In combination, an integrated customer premise system for connection to both an external analog telephone network and to a digital packet network for conducting both analog and voice-over-packet (VoP) telephone calls in the same customer premise system, said system comprising a digital processor including an analog call processor, a VoP call processor, and a command response processor, interfaces connecting telephone calls from the external analog telephone network to said analog call processor and for connecting VoP telephone calls from the external packet network to said VoP call processor, a plurality of customer audio devices; and a switching and bridging system connected to said analog call processor and said VoP call processor for connecting one or both of said analog and digital telephone calls to said customer audio devices, and a computing device connected to said command response processor, whereby said computing device obtains access to said digital packet network through said command control processor, and said computer device including a digital interface connected to the external packet network and said interface for connecting VoP telephone calls from the external packet network to said VoP call processor includes said computer device.

* * * * *